United States Patent
Florczak

(10) Patent No.: US 9,587,906 B1
(45) Date of Patent: Mar. 7, 2017

(54) PALM SHELF INSERT

(71) Applicant: Edward Florczak, Shelton, CT (US)

(72) Inventor: Edward Florczak, Shelton, CT (US)

(73) Assignee: Edward Florczak, Shelton, CT (US)

( * ) Notice: Subject to any disclaimer, the term of this patent is extended or adjusted under 35 U.S.C. 154(b) by 0 days.

(21) Appl. No.: 14/970,703

(22) Filed: Dec. 16, 2015

(51) Int. Cl.
*F41C 23/10* (2006.01)
*F41C 23/12* (2006.01)
*F16M 13/04* (2006.01)

(52) U.S. Cl.
CPC ............ *F41C 23/12* (2013.01); *F16M 13/04* (2013.01)

(58) Field of Classification Search
CPC .......... F41C 23/00; F41C 23/10; F41C 23/12; F41C 23/14; F41C 23/16; F41C 23/18; F41C 27/00; F41A 35/00
USPC ................................ 89/1.42; 42/71.02, 70.11
See application file for complete search history.

(56) References Cited

U.S. PATENT DOCUMENTS

| | | | |
|---|---|---|---|
| 2,926,448 A | 3/1960 | Stam | |
| 3,128,571 A * | 4/1964 | Herrett | F41C 23/10 42/71.02 |
| 3,757,634 A * | 9/1973 | Uria | F41A 3/68 42/70.08 |
| 3,798,818 A * | 3/1974 | Casull | F41C 23/12 42/72 |
| 4,520,585 A * | 6/1985 | Barrett | F41C 23/10 42/7 |
| 4,558,533 A | 12/1985 | Seliga | |
| 4,630,387 A * | 12/1986 | Crane | F41C 23/10 42/71.02 |
| 5,052,140 A * | 10/1991 | Smith | F41C 23/10 42/7 |
| 5,341,586 A * | 8/1994 | Aluotto | F41C 23/14 42/7 |
| 5,584,136 A * | 12/1996 | Boland | F41A 9/71 42/50 |
| 5,761,842 A * | 6/1998 | Mantymaa | F41C 23/12 42/71.02 |

(Continued)

OTHER PUBLICATIONS

Photo of HK MR 5556 A1 with pistol grip with palm shelf found at: http://smg.photobucket.com/user/towerdog/media/IMG_1488.jpg.html.

(Continued)

*Primary Examiner* — Derrick Morgan
(74) *Attorney, Agent, or Firm* — UConn IP Law Clinic; Kelly Field; Christopher Holshouser

(57) ABSTRACT

The palm shelf insert consists of insert, palm shelf, and fastener components. The palm shelf component is adjustably attached to the insert component, allowing the user to customize fit. This allows users with different hand sizes to utilize the palm shelf insert comfortably. The modular structure of the palm shelf insert, allows the user to use the components of the device interchangeably. One benefit of the present invention is that it enables the attachment of a palm shelf to a permanently-attached pistol grip. The palm shelf insert adds stability to the rifle, giving the user a stable platform on which to rest the rifle. It aids the user in maintaining a comfortable hand position and stabilizes the weapon. The palm shelf insert is inserted into the hollow cavity of permanently-attached pistol grip and is custom-made to fit any of a multitude of weapons.

15 Claims, 3 Drawing Sheets

(56) References Cited

U.S. PATENT DOCUMENTS

| | | | | |
|---|---|---|---|---|
| 5,778,588 A * | 7/1998 | Allen, III | F41C 23/12 42/71.02 |
| 5,816,683 A * | 10/1998 | Christiansen | F41C 27/00 362/110 |
| 5,864,978 A * | 2/1999 | McRary | F41C 23/00 264/273 |
| 6,357,156 B1 * | 3/2002 | Klebes | G06K 9/0002 42/70.01 |
| 6,434,875 B1 * | 8/2002 | Constant | F41A 15/16 42/70.11 |
| 6,536,152 B1 * | 3/2003 | Wisz | F41C 23/22 42/1.02 |
| 7,117,622 B2 * | 10/2006 | Freed | F41A 9/65 42/50 |
| 7,950,179 B2 * | 5/2011 | Confrey | F41C 23/10 42/49.01 |
| 7,954,271 B1 * | 6/2011 | Bentley | F41C 23/16 42/71.01 |
| 9,303,948 B2 * | 4/2016 | Freed | F41A 9/65 |
| 2002/0069570 A1 * | 6/2002 | Lee | F41A 7/08 42/70.11 |
| 2005/0179799 A1 * | 8/2005 | Umanskiy | F41C 27/00 348/333.01 |
| 2007/0256347 A1 * | 11/2007 | Fitzpatrick | F41A 11/02 42/96 |
| 2010/0325932 A1 * | 12/2010 | Zukowski | F41A 17/46 42/6 |
| 2013/0139426 A1 * | 6/2013 | Baxley | F41C 23/10 42/71.02 |
| 2013/0318850 A1 * | 12/2013 | Holmes | F41A 23/18 42/90 |
| 2014/0053447 A1 * | 2/2014 | Singh | F41C 23/06 42/71.02 |
| 2016/0187099 A1 * | 6/2016 | Cottle | F41C 23/14 42/73 |
| 2016/0265872 A1 * | 9/2016 | Tarazi | F41C 27/22 |

OTHER PUBLICATIONS

Ergo Tactical Deluxe Grip with Palm Shelf for sale on Ergogrips.net website: http://ergogrips.net/products/ergo-rifle-grips/ergo-tactical-deluxe-grip-with-palm-shelf.html.

Youtube video showing how the Ergogrips are installed: https://www.youtube.com/watch?v=UylOgPNhp4Y.

Ultimate Arms Gear AR Sniper Style with Palm Rest Shelf Pistol Gnp for sale on the ultimatearmsgear.com website: http://www.ultimatearmsgear.com/Ultimate-Arms-Gear-Sniper-Pistol/dp/B015GE4SNE?class=quickView&field_availability=-1&field_browse=64364990118,field_keywords=palm+shelf&id=Ultimate+Arms+Gear+Sniper+Pistol&ie=UTF8&refinementHistory=brandtextbin%2Csubjectbin%2Ccolor_map%2Cprice%2Csize_name&searchKeywords=palm.

Panther Tactical Grip for sale on the dpmsinc.com website: http://www.dpmsinc.com/Panthertrade-Tactical-Grip_p_464.html.

Photo of airgun with adjustable palm shelf: http://www.pyramydair.com/blog/2013/06/hatsan-at-p1-pcp-air-pistol-part-1/.

* cited by examiner

PALM SHELF INSERT

BACKGROUND OF THE INVENTION

The present invention is generally directed to accessory attachments for firearms.

Modular weapon systems are popular designs for rifles due to the level customization that is possible. Many modular rifles have a detachable or permanently-attached pistol grip affixed to the lower portion of the rifle.

A palm shelf is a popular modification to a detachable pistol grip. The palm shelf adds stability to the rifle, giving the user a stable platform on which to rest the rifle. However, there is currently no technology available to effectively attach a palm shelf to a permanently-attached pistol grip.

Thus, there exists a need for a palm shelf insert that overcomes the above and other deficiencies.

SUMMARY OF THE INVENTION

Thus, according to various aspects of the invention, a solution to the problem presented is a palm shelf insert that aids the user in maintaining a comfortable hand position and stabilizing the weapon. The palm shelf insert is inserted into the hollow cavity of permanently-attached pistol grip. The palm shelf insert is custom-made to fit any of a multitude of presently-made weapons and potentially those available in the future. The palm shelf insert is especially useful as attached to lower receivers of firearms with non-detachable pistol grips. The palm shelf insert is also customizable to the user's hand size because the palm shelf component is adjustably attached to the insert component.

The assembled palm self insert device consists of an insert component, a palm shelf component, and fastener components. The palm shelf component is adjustably attached to the insert component, allowing the user to raise or lower the palm shelf component, relative to insert component, to customize fit. This allows users with different hand sizes to utilize the palm shelf insert comfortably. The modular structure of the palm shelf insert, allows the user to use the components of the device interchangeably. For example, a day-to-day rugged polymer palm shelf component can be exchanged for a fancier or more expensive wooden palm shelf component when the occasion warrants. A gap in palm shelf component, allows the palm shelf component to flex, allowing the palm shelf component to be securely fastened to the insert component. The gap in the palm shelf component may be narrow or wide. The gap allows for customizable fit and allows the palm shelf component to be securely fastened to the insert component.

The insert component has an extended portion that is designed to extend from the end of a pistol grip. The insert component can be various lengths and widths to conform to the hollow cavity of the pistol grip to which it will be associated. The extended portion of the insert component can be various shapes and sizes to allow for correct fit between the insert component and the palm shelf component, and the insert component and the pistol grip. The slot in the extended portion of the insert component can be various lengths and width to accept a variety of different fasteners. The extended portion of the insert component can have a varying degree of curve associated with the top of the extended portion. This could allow for different hand positions that may be appealing to different users. This contour can take many different shapes with many different degrees of curvature.

The palm shelf component has thru-holes and a gap in the semi-oval structure. The thru-hole can be placed anywhere along the side of the palm shelf component in order to effect correct fit of the insert component and the palm shelf component. The gap in the semi-oval structure can be large or small, to allow for the effective securing of the palm shelf component to the insert component.

The fasteners used to secure the palm shelf component to the insert component can be a machine screw and a nut. The head of the fastener could be a hex, star, Torx, security, phillips, flat-head screw, or any other appropriate pattern.

The assembled palm shelf insert is removably attached to a pistol grip of a lower receiver of a firearm. The insert component of the palm shelf insert fits snugly in the cavity of the pistol grip. The palm shelf component is adjustably and removably affixed to the extended portion of the insert component.

A method for producing a palm shelf insert to be attached to a pistol grip, to be used to stabilize the weapon and user may be accomplished by casting a mold of the cavity of the pistol grip, including a wider extended portion that extends from the end of the grip, to form the insert component; forming a slot through the extended portion of the insert component to allow a fastener to adjustably pass through the extended portion of the insert component; creating a model of the palm shelf component by forming a semi-oval donut-shaped open ring with a hollow center; creating a cast of the palm shelf component; forming holes through both sides of the ring to allow a fastener to pass through the palm shelf component; and attaching the palm shelf component to the insert component by: placing the palm shelf component over the extended portion of the insert component; placing the fastener through the palm shelf component and extended portion of the insert component; and tightening the fastener such that the palm shelf component is secured to the insert component.

Self-hardening liquid resin may be used to form the insert and palm shelf components. Self-hardening clay may be used to form the model for the palm shelf component. Cast templates may be manufactured to facilitate reproducibly making the insert and palm shelf components. Molding rubber may be used to form the cast templates.

The shortcomings of the prior art are overcome and additional advantages are provided through affixing the palm shelf to the permanently-attached pistol grip by way of inserting it into the permanently-attached pistol grip.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 6 depicts a method of making a palm shelf insert.

DETAILED DESCRIPTION

Detailed embodiments of the present invention are disclosed herein. However, it is to be understood that the disclosed embodiments are merely exemplary of the invention, which may be embodied in various forms, the figures are not necessarily to scale, and some features may be exaggerated to show details of particular components or steps.

Figure 1:
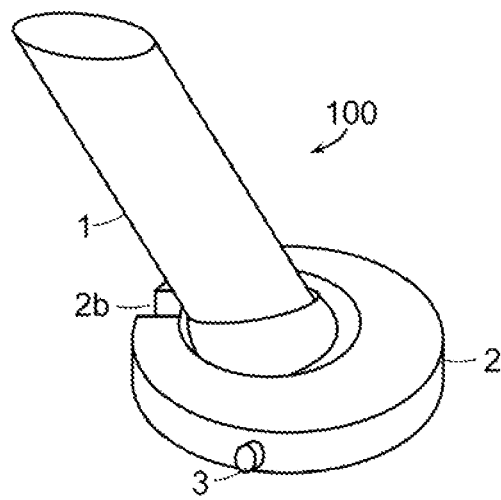
FIG. 1 depicts a perspective view of the assembled palm shelf insert device.

FIG. 1 is a perspective view of an assembled palm shelf insert 100. The palm shelf insert 100 comprises an insert component 1, a palm shelf component 2, and a fastener component 3. The palm shelf component 2 is adjustably attached to the insert component 1, allowing the user to raise or lower the palm shelf component 2, relative to insert component 1, to customize the fit. This allows users with different hand sizes to utilize the palm shelf insert 100 comfortably. The modular structure of the palm shelf insert 100, allows the user to use the components of the device interchangeably. For example, a day-to-day rugged polymer palm shelf component 2 can be exchanged for a fancier or more expensive wooden palm shelf component 2 when the occasion warrants. The gap 2b in palm shelf component 2, allows palm shelf component 2 to flex, allowing palm shelf component 2 to be securely fastened to various sized insert components 1. The gap 2b may be narrow or wide. The gap 2b allows for customizable fit and allows the palm shelf component 2 to be securely fastened to the insert component 1.

Figure 2:
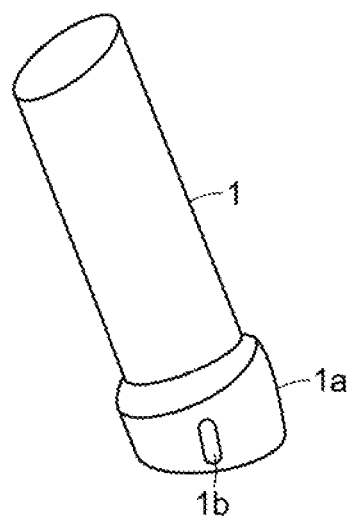
FIG. 2 depicts a perspective view of the insert component of the palm shelf insert device.

FIG. 2 is a perspective view of the insert component 1 showing a first end 1a, the first end 1a of the insert component 1, and the slot 1b on the first end 1a. The insert component 1 can be various lengths and widths to conform to the hollow cavity of the pistol grip to which it can slide into. The first end 1a can be various shapes and sizes to allow for correct fit among all of the components. The slot 1b can be various lengths and width to accept different sized fasteners.

Figure 3:
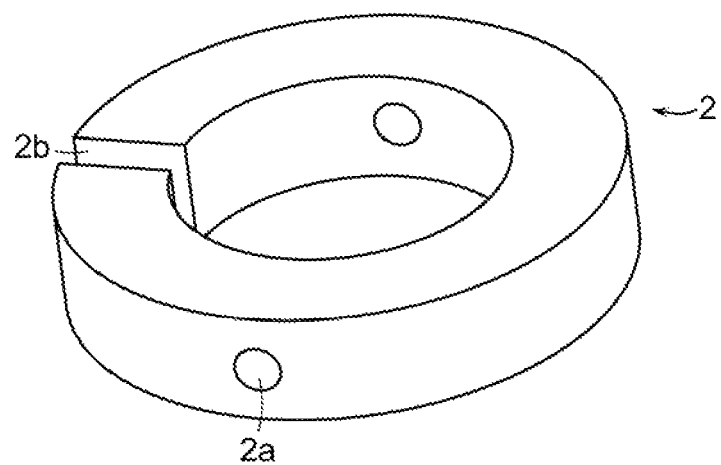
FIG. 3 depicts a perspective view of the palm shelf component of the palm shelf insert.

FIG. 3 is a perspective view of the palm shelf component 2 showing a thru-hole 2a and the gap 2b in the semi-oval structure 2. The thru-hole 2a can be placed anywhere along the side of the palm shelf component 2 in order to effect a proper fit of the insert component 1 to the palm shelf component 2. The gap 2b in the semi-oval structure 2 can be large or small, to allow for the effective securing of the palm shelf component 2 to the insert component 1. A semi-oval structure is shown in FIG. 3, but other suitable shapes may be used, such as but not limited to circular, hexagonal, octagonal, trapezoidal, etc.

Figure 4:
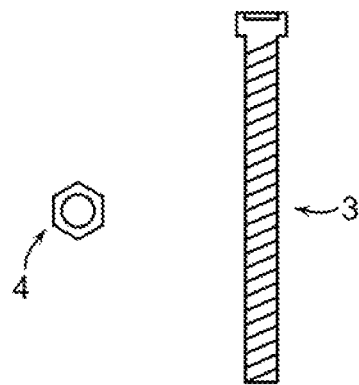
FIG. 4 depicts the fastener components of the palm shelf insert.

FIG. 4 depicts a fastener component 3 and a fastener component 4, used to secure the palm shelf component 2 to the insert component 1. In this embodiment, fastener component 3 may be a machine screw and fastener component 4 may be a nut. The head of the fastener may be a hex, star, Torx, security, Phillips, flat-head screw, or any other suitable shape.

Figure 5:
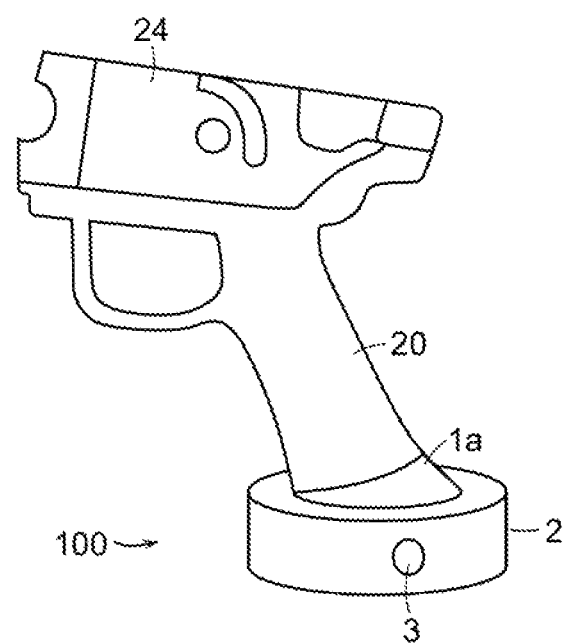
FIG. 5 depicts a side view of the assembled palm shelf insert removably attached to a pistol grip of a lower receiver of a firearm.

FIG. 5 depicts a side view of the assembled palm shelf insert 100 removably attached to a pistol grip 20 of a lower receiver of a firearm 24. The insert component 1 of the palm shelf insert 100 fits snugly in the cavity of the pistol grip and is not visible in this view due to being inside the pistol grip 20. The palm shelf component 2 is adjustably and removably affixed to the first end 1a of the insert component 1.

FIG. 6 depicts a method of making a palm shelf insert to be attached to a pistol grip, by casting a mold of the cavity of the pistol grip, including a wider extended portion that extends from the end of the grip, to form the insert component 200; forming a slot through the extended portion of the insert to allow a fastener to adjustably pass through the extended portion of the insert component 204; creating a model of the palm shelf component by forming a semi-oval donut-shaped open ring with a hollow center 208; creating a cast of the palm shelf component 214; forming holes through both sides of the ring to allow a fastener to pass through the palm shelf component 218; attaching the palm shelf component to the insert 224 by: placing the palm shelf component over the extended portion of the insert component 228; placing the fastener through the palm shelf component and extended portion of the insert component 234; and tightening the fastener such that the palm shelf component is secured to the insert component 238.

A method for producing a palm shelf insert 100 to be attached to a pistol grip, to be used to stabilize the weapon and user may be accomplished by casting a mold of the cavity of the pistol grip, including a first end 1a that extends from the end of the grip, to form the insert component 1. Then forming a slot 1b through the first end 1a of the insert component 1 to allow a fastener 3 to adjustably pass through the first end 1a of the insert component 1. Then creating a model of the palm shelf component 2 by forming a semi-oval donut-shaped open ring with a hollow center; creating a cast of the palm shelf component 2. Next, forming holes 2a through both sides of the ring to allow a fastener 3 to pass through the palm shelf component 2. Attaching the palm shelf component 2 to the insert component 1 by: placing the palm shelf component 2 over the first end 1a of the insert component 1. Then placing the fastener 3 through the palm shelf component 2 and first end 1a of the insert component 1. Next, tightening the fastener component 3 and fastener component 4, such that the palm shelf component 2 is secured to the insert component 1.

Self-hardening liquid resin may be used to form the insert component 1 and the palm shelf component 2. Self-hardening clay may be used to form the model for the palm shelf component 2. Cast templates may be manufactured to facilitate reproducibly making insert component 1 and palm shelf component 2. Molding rubber may be used to form the cast templates.

In order to secure the insert 1 to the handle or pistol grip of a gun, the following may be used: 1.) Screw (similar to the one on the palm shelf); 2.) Nut; 3.) Two washers. A "hole" or "cavity" may be made from top to bottom, of the insert 1. A washer may be placed on both ends of the insert component 1, then a screw long enough to travel through the entire shaft of the insert 1 starting at the bottom of the insert 1, than attaching a nut on the other end goes inside the gun handle.

To use this invention, one may simply insert the shaft into the hollow end of the Navy style trigger housing pistol grip; tighten the screw that in the shaft, forming a secure and tight fit. Place on the palm shelf onto the extending adjustable shaft handle adjust for personalized comfort slide screw threw palm shelf, through the shaft handle out through the other side of the palm shelf and tighten nut. Then the insert is placed in the handle, the diameter of the shaft is increased/decreased by turning the screw, compressing the shafts mid section, forcing it outwards and pressing it against the wall of the pistol grip, forming a tight seal.

This invention has many advantages. Long guns may be easily modified by users such that they have the look and feel of guns that have an integrated palm shelf handle. The palm shelf is adjustable by the user. Guns may be retrofitted by users to have a palm shelf.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A palm shelf for a firearm comprising:
   an insert component, of appropriate size and shape to snugly plug the interior cavity of a pistol grip, having a first end having an extended portion configured to extend beyond the bottom of the pistol grip;
   a palm shelf component adjustably secured generally orthogonally to the first end of the insert component;
   a means for adjustably securing the palm shelf component to the insert component;
   wherein the insert component comprises a slot through the extended portion of the insert component to allow a fastener to adjustably pass through the extended portion of the insert component; and
   wherein the palm shelf component comprises semi-oval donut-shaped non-contiguous open ring with a hollow center.

2. The palm shelf insert as claimed in claim 1, wherein the insert component comprises self-hardening liquid resin.

3. The palm shelf insert as claimed in claim 1, wherein the extended portion of the insert component is wider than the insertable portion of the insert.

4. The palm shelf insert as claimed in claim 1, wherein the palm shelf component comprises self-hardening liquid resin.

5. The palm shelf insert as claimed in claim 1, wherein the palm shelf component further comprises holes on opposing sides of the palm shelf component to allow a fastener to pass through the palm shelf component.

6. The palm shelf insert as claimed in claim 5, wherein the fastener comprises a machine screw and a nut.

7. The palm shelf insert as claimed in claim 1, wherein the insert is configured to attached to HK91, HKG3, HK51, PTR91, and HK-style guns, long guns, pistols, and rifles.

8. The palm shelf insert as claimed in claim 1, removably and adjustably attached to a firearm.

9. A method for producing a palm shelf insert to be attached to a pistol grip, to be used to stabilize the weapon and user, the method comprising the following steps:
   casting a mold of the cavity of the pistol grip, including a wider extended portion that extends from the end of the grip, to form the insert component;
   forming a slot through the extended portion of the insert to allow a fastener to adjustably pass through the extended portion of the insert component;
   creating a model of the palm shelf component by forming a semi-oval donut-shaped open ring with a hollow center;
   creating a cast of the palm shelf component;
   forming holes through both sides of the ring to allow a fastener to pass through the palm shelf component;
   attaching the palm shelf component to the insert by:
      placing the palm shelf component over the extended portion of the insert component;
      placing the fastener through the palm shelf component and extended portion of the insert component; and
      tightening the fastener such that the palm shelf component is secured to the insert component.

10. The method according to claim 9, further comprising using self-hardening liquid resin to form the insert and palm shelf components.

11. The method according to claim 9, further comprising using self-hardening clay to form the model for the palm shelf component.

12. The method according to claim 9, further comprising manufacturing cast templates for the insert and palm shelf components.

13. The method according to claim 12, further comprising using a molding rubber to form the cast templates.

14. A palm shelf insert, manufactured according to claim 9.

15. A palm shelf insert system comprising:
   a firearm with a pistol grip;
   an interior cavity located in the pistol grip;
   an insert component, of appropriate size and shape to snugly plug the interior cavity, having a first send having an extended portion configured to extend beyond the bottom of the pistol grip;
   a palm shelf component adjustable secured generally orthogonally to the first end of the insert component; and a means for adjustably securing the palm shelf component to the insert component;
   wherein the insert component comprises a slot through the extended portion of the insert component to allow a fastener to adjustably pass through the extended portion of the insert component; and
   wherein the palm shelf component comprises semi-oval donut-shaped non-contiguous open ring with a hollow center.

* * * * *